United States Patent
Zhou et al.

(10) Patent No.: US 7,894,410 B2
(45) Date of Patent: Feb. 22, 2011

(54) METHOD AND SYSTEM FOR IMPLEMENTING BACKUP BASED ON SESSION BORDER CONTROLLERS

(75) Inventors: Weiqiang Zhou, Shenzhen (CN); Jing Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 760 days.

(21) Appl. No.: 11/651,294

(22) Filed: Jan. 9, 2007

(65) Prior Publication Data

US 2007/0160058 A1 Jul. 12, 2007

(30) Foreign Application Priority Data

Jan. 9, 2006 (CN) .................. 2006 1 0000199

(51) Int. Cl.
*H04W 4/00* (2009.01)
(52) U.S. Cl. .............. 370/338; 370/331; 370/395.2; 379/221.03; 455/436
(58) Field of Classification Search .............. None
See application file for complete search history.

(56) References Cited

U.S. PATENT DOCUMENTS

| | | | |
|---|---|---|---|
| 5,546,378 | A | 8/1996 | Wirth et al. |
| 6,230,005 | B1 * | 5/2001 | Le et al. .............. 455/414.1 |
| 6,804,229 | B2 * | 10/2004 | Landaveri et al. .......... 370/386 |
| 2002/0078232 | A1 * | 6/2002 | Simpson et al. .......... 709/238 |
| 2002/0093954 | A1 * | 7/2002 | Weil et al. .............. 370/389 |
| 2004/0114748 | A1 * | 6/2004 | Copley .............. 379/221.03 |
| 2004/0257983 | A1 * | 12/2004 | Kopp et al. ............. 370/217 |
| 2005/0119001 | A1 * | 6/2005 | Watanabe .............. 455/436 |
| 2006/0133353 | A1 * | 6/2006 | Wang et al. .............. 370/352 |

FOREIGN PATENT DOCUMENTS

| | | |
|---|---|---|
| CN | 1581828 A | 2/2002 |
| CN | 1536819 A | 10/2004 |

OTHER PUBLICATIONS

English Translation of the Written Opinion from the State Intellectual Property Office of China in International Application No. PCT/CN2006/003093 mailed Feb. 15, 2007.

* cited by examiner

*Primary Examiner*—Kent Chang
*Assistant Examiner*—Dinh P Nguyen
(74) *Attorney, Agent, or Firm*—Finnegan, Henderson, Farabow, Garrett & Dunner LLP (57) ABSTRACT

A method and a system for implementing backup based on session border controllers, including: a terminal device registers to a first soft switch via a first session border controller; the terminal device detects whether a failure concerning the first session border controller occurs. If a failure occurs, the terminal device registers to the first soft switch via a second session border controller; the first or the second session border controller detects whether a failure concerning the first soft switch occurs. If a failure occurs, the terminal device registers to the second soft switch. In addition, the invention further provides a corresponding system. With the present invention, media stream can pass through the NAT and firewall on the basis of adding session border controllers in the NGN network, and by implementing dual homing of the session border controller, paralyzing of the soft switches can be prevented, or a disaster tolerance mechanism for emergency communication can be provided, when burst disaster appears to the system.

15 Claims, 5 Drawing Sheets

METHOD AND SYSTEM FOR IMPLEMENTING BACKUP BASED ON SESSION BORDER CONTROLLERS

The present application claims priority to Chinese Patent No. 20061000019.3 filed on Jan. 9, 2006, title "method and system for implementing dual homing of session border controllers", and all the content is hereby incorporated by reference.

FIELD OF THE INVENTION

The present invention relates to network communication technology field, particularly to a method and a system for implementing backup based on session border controllers.

BACKGROUND OF THE INVENTION

A dual homing technology in Next Generation Network (NGN) field can prevent a soft switch from paralyzing or provide disaster tolerance mechanism of emergent communication when a burst disaster appears in a system. In the case of extreme exceptions, when the system enables dual homing control mechanism, 80%~90% of the communication capability should be able to be restored.

Figure 1:
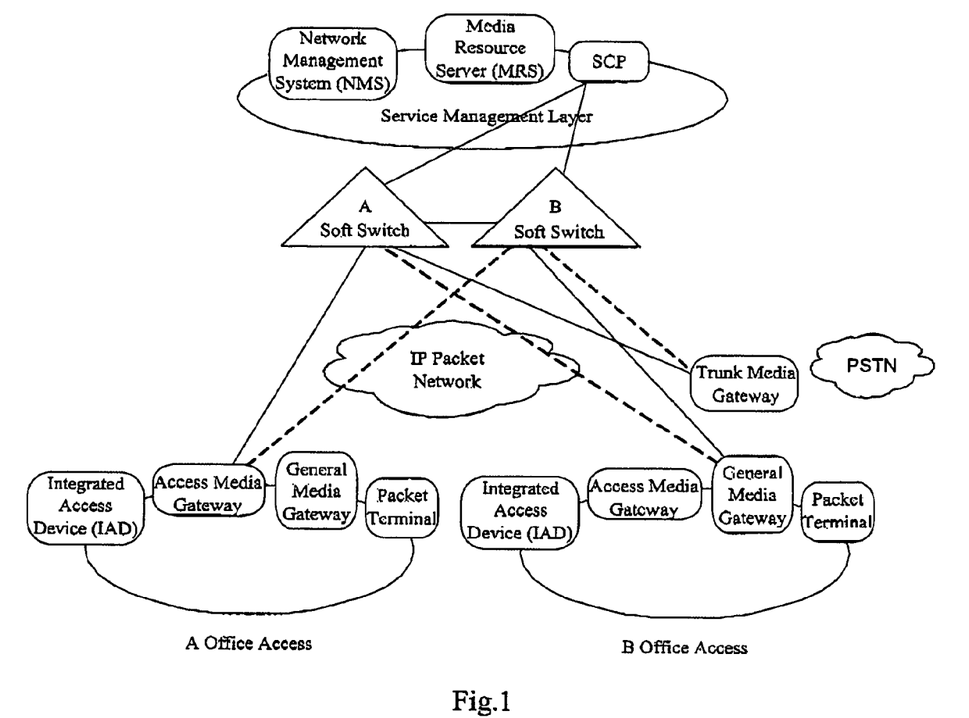
FIG. 1 is a diagram illustrating a system structure of the dual homing technology in NGN network in the prior art.

FIG. 1 is a schematic diagram illustrating dual homing control technology:

The service management layer includes: service management devices, such as a Network Management System (NMS) a Media Resource Sever (MRS) and a Service Control Point (SCP) etc; these service management devices are connected with lower layer gateway devices via soft switches. Soft switches A and B have the mutual aid function, i.e., when the soft switch A (B) is in failure or the communication is interrupted, the soft switch B (A) can take over part or all of the services of the soft switch A (B); there is a heartbeat link (which adopts private protocol, and is indicated by a bold real line in FIG. 1) between soft switches A and B, which is used to detect mutually whether the operation of the opposite soft switch is normal. The soft switches A and B can be located physically in different geographical areas, and can be regarded as two independent exchanges in terms of networking.

The soft switches are connected with gateway devices of access point A and access point B via IP packet network or Public Switched Telephone Network (PSTN). The solid lines denote primary signaling channels, and dashed lines denote secondary signaling channels. The gateway devices include: an Integrated Access Device (LAD), an access media gateway, a universal media gateway, a trunk media gateway and a packet terminal etc; the packet terminal includes a H.323 terminal or a SIP terminal. These terminals can be hard terminals or soft terminals.

The dual homing control technology mainly consists of two parts, one is dual homing mechanism controlled by gateways, and another is dual homing mechanism controlled by services. In the dual homing controlled by gateways, each soft switch is configured with both the data of gateway devices controlled primarily by the soft switch and the data of gateway devices controlled secondarily by the soft switch, and each gateway device or packet terminal is configured with the related information of its primary homing soft switch and secondary homing soft switch, consequently, when one of the soft switches doesn't work or performs the dual homing handover, the gateway device which is controlled primarily by the soft switch can re-register to the secondary homing soft switch automatically or under the instruction of the secondary homing soft switch.

In the dual homing controlled by services, the user data and the office data, such as the local number-header set, the call source code, charging source code, the user number segment, the route number, the route selection code, the trunk group number, the call prefix etc., are planed uniformly between the soft switches A and B, so that both of the two soft switches can take over part or all services of the opposite soft switch when the dual homing handover happens, and all the attributes of the users, such as call and charging attributes, will not be affected before and after the handover. The system is configured with unified network management for centralized management of all the elements in the network, so as to guarantee that the office data or user data of the two soft switches can remain consistent or coordinated When the dual homing solution is adopted in networking, the amount of gateways and users that can be controlled by a single soft switching office is proposed not to exceed 50% of the rated capability of the soft switch.

The dual homing handover means a process, in which, when a soft switch is in the mutual aid work mode, the mutual aid state of the soft switch is converted from an inactive state into an active state, or the active state is restored into the inactive state. The active state means that a soft switch has taken over the service control of its mutual aid soft switch; and the inactive state means that a soft switch has not taken over the service control of its mutual aid soft switch. The way of handover may include manual mode and automatic mode:

The manual handover mode: when a soft switch is in the mutual aid work mode, the mutual aid state of the soft switch will change only after an operator sends the handover instruction to it via a terminal system or a network management system; the automatic handover mode: when a soft switch is in the mutual aid work mode, the soft switch will determine automatically whether the mutual aid state needs to be changed according to the state of the heartbeat link between the soft switch and its mutual aid soft switch.

The heartbeat signal exists between two mutual aid soft switches, which is a detection mechanism implemented by the local soft switch to determine the work state of the opposite soft switch. If the local soft switch hasn't received the heartbeat signal transmitted by the opposite soft switch within a scheduled time, the local soft switch may consider that the opposite soft switch is subject to the failure. Then the mutual aid state of the local soft switch will change from the inactive state to the active state if the local soft switch is in the automatic handover mode.

The gateway device determines the work state of the soft switch by the handshake signal between the soft switch and the gateway device. If the gateway device hasn't received the handshake signal transmitted by the soft switch within a scheduled time, the gateway device may consider that the soft switch that controls it (the primary homing soft switch) is subject to the failure. Thus, the gateway device will request for registration at another soft switch (the secondary homing soft switch).

in addition, in order to have cooperation between the soft switch and the gateway device, it's necessary to use a timer. The duration of the heartbeat signal detection timer (generally 1~5 minutes) of the soft switch should be generally shorter than that of the handshake signal transmission timer (generally 5 minutes), i.e., only after the local soft switch has detected that the transmission of the heartbeat signal from the opposite soft switch is overtime, the local soft switch can normally process the registration application transmitted by the gateway device which is secondarily-controlled by it; if the local soft switch has received the registration application of the gateway device secondarily-controlled by it before it detects that the transmission of the heartbeat signal from the opposite soft switch is overtime, the local soft switch will reject the registration application of the gateway device secondarily-controlled by it.

Although the dual homing mechanism of the NGN has been realized in the prior art, some new problems appeared with the increase of requirement of the NGN broadband services-Broadband services have strong requirements for bearer network (such as enterprise network and premise network) in IP address translation, Quality of Service (QoS) guarantee, security guarantee, etc., however, the media streams can not pass through the Network Address Translation (NAT) device and the firewall device in the NGN itself In order to solve these problems, it's necessary to add a Session Border Controller (SBC) to the edge of the present IP network to constitute a services-based intelligent network, so as to realize passage of the media stream through the NAT device and the firewall.

SBC can be regarded as an agent supporting the VoIP (Voice over IP), which is a device that can identify the application layer and identify the information of the fifth layer and the seventh layer, and also can process various session signaling protocols of the fifth layer and modify the address of data packet header, so as to realize the address translation between the inner and outer network of the SBC. Meanwhile, the SBC can assist the VoIP to pass through remote firewall or the NAT device. Generally, SBC may be set on the network core switch side, and after coordination and modification, all of the signalings and media streams that pass though the SBC can be transmitted correctly on the system side and user side, and the NAT or firewall on user side may accept the modified signalings and media streams and transmit them to the inner network on user side.

SBC can assist the Session InitiationProtocol (SIP)/Media Gateway Control Protocol (MGCP) signaling to pass through the existing firewall or NAT, and the existing firewall or NAT device doesn't need to be changed. Particularly, for SIP terminal, the SIP terminal device will send the registration message periodically to SBC; for MGCP terminal, when the first registration message of the MGCP device has been received, SBC will send the Audit Endpoint (AUTEP) message to terminal periodically and force the terminal to continually reply with the 200 OK message periodically. Thus, because signaling messages pass through the firewall or NAT device continually, a fixed port may be maintained for the passed message stream by the firewall or NAT device; in addition, when the registration messages pass through the SBC, the information, such as the ports and the IP address of the third layer of the firewall, will be recorded, and this information will be recorded together with the information of the fifth layer, such as the username or telephone number of the terminal behind the firewall. Thus when a signaling arrives, SBC will send it to the called party with the correct address and port of the firewall.

When the call has been established, the bi-directional ports for media stream are established dynamically. Since the media stream will also pass through the SBC, the IP address and the port of the firewall can be identified by SBC according to the call related to the media stream (the username or the telephone number of the information of the fifth layer). Therefore, the corresponding media stream can be sent to the related IP address and port of the firewall by the SBC and then reaches the user side behind the firewall correctly.

Although the transmission of the media stream through the NAT and the firewall may be realized in the foregoing services-based intelligent network constituted by SBC, the dual homing mechanism can not be implemented as in the present NGN network, so the paralysis of the soft switch can not be prevented, and the disaster tolerance mechanism of emergent communication can not be provided when a burst disaster appears in the system.

SUMMARY OF THE INVENTION

The embodiments of the present invention provide a method and a system for implementing backup based on session border controllers and a method for the implementation of dual horning of soft switches supported by session border controllers, so that the dual homing function can be provided when there are SBCs in NGN network.

The embodiments of the present invention provide a method for implementing backup based on, session border controllers, including:
registering to a first soft switch via a first session border controller;
registering to the first soft switch via a second session border controller, when a failure concerning the first session border controller occurs; and
registering to a second soft switch via one of the first session border controller and the second session border controller, when a failure concerning the first soft switch occurs.

Another embodiment of the present invention provides a method for implementing backup based on session border controllers, including:
registering to a first soft switch via a first session border controller;
detecting whether a failure concerning the first session border controller occurs, and if the failure occurs, moving to a step of registering to the first soft switch via a second session border controller, otherwise, operating normally; and
registering to the first soft switch via a second session border controller.

Another embodiment of the present invention provides a method for implementing the dual homing of soft switches supported by session border controllers, including:
detecting a first soft switch via the session border controller, and forwarding the related information that needs to be sent to the first soft switch to a second soft switch, when the session border controller has not received a response from the first soft switch within a predetermined period; and
taking over the terminals and gateways of the primary soft switch via the second soft switch after determining that the heartbeat signal between the first and second soft switches is interrupted.

A system for implementing backup based on session border controllers provided by embodiments of the present invention, includes a first soft switch, a second soft switch, a first session border controller, a second session border controller and at least one terminal device,
the first soft switch is configured as a primary soft switch, the second soft switch is configured as a secondary soft switch; the first session border controller is a primary session border controller, the second session border controller is a secondary session border controller;
the terminal device performs registration and authentication at the first soft switch via the first session border controller;
the terminal device performs registration and authentication at the first soft switch via the second session border controller, when the terminal device detects that a failure concerning the first session border controller occurs; and the terminal device performs registration and authentication at the second soft switch via the first or the second session border controller, when the first or the second session border controller detects that a failure concerning the first soft switch occurs.

A system for implementing backup based on session border controllers provided by another embodiment of the present invention, includes a first soft switch, a first session border controller, a second session border controller and at least one terminal device, the first session border controller is a primary session border controller, the second session border controller is a secondary session border controller; the terminal device performs registration and authentication at the first soft switch via the first session border controller; and the terminal device performs registration and authentication at the first soft switch via the second session border controller, when the terminal device detects that a failure concerning the first session border controller occurs.

To sum up, in the present invention, on the basis of adding session border controllers in NGN network, the corresponding relationship between the terminal device and the soft switch is configured in the session border controller, and the terminal device may register to the soft switch via the session border controller; when a failure concerning the session border controller occurs, the terminal device may register to the soft switch via another session border controller; when a failure concerning the soft switch occurs, the terminal device may register to another soft switch, therefore the dual homing of the user may be realized by utilizing the session border controllers, and the backup mechanism of the session border controller and the soft switch may be created, the transmission of the media stream through the NAT and the firewall can be realized, and the security and the reliability of the communication can be improved, the paralysis of the soft switch can be prevented, or the disaster tolerance mechanism of emergent communication can be provided when burst disaster appears in a system.

DETAILED DESCRIPTION OF THE EMBODIMENTS

A further detailed description of the preferred technical embodiments of the invention will be given below in conjunction with the accompanying drawings.

Embodiment 1

Figure 2:
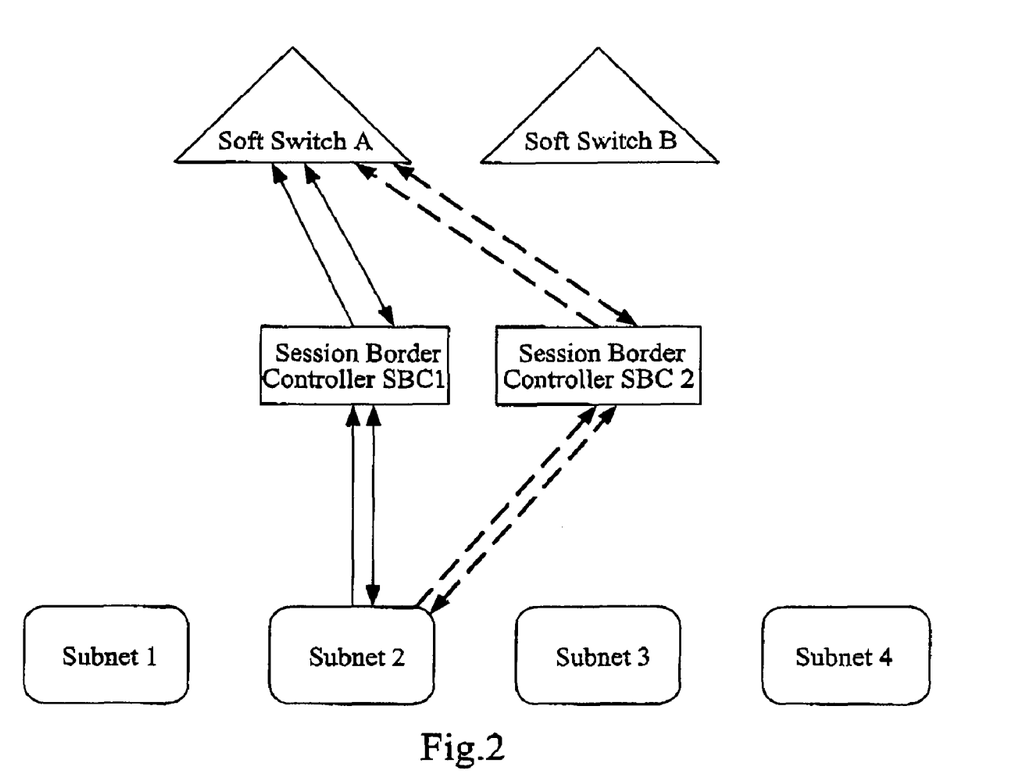
FIG. 2 is a schematic diagram illustrating the principle of dual horning of the session border controllers in the first embodiment of the present invention.

A system for implementing the dual homing of session border controllers of the invention is shown as FIG. 2, which includes a soft switch A (the first soft switch), a soft switch B (the second soft switch), a session border controller SBC1 (the first session border controller), a session border controller SBC2 (the second session border controller) and four terminal devices, wherein, the relationship between the soft switch A and the soft switch B is dual homing; the terminal devices include different subnets and SIP, MGCP, H248, R323 device etc., and each terminal device is configured with a primary soft switch and a secondary soft switch, and the terminal devices belonging to the same subnet will be registered to the same primary soft switch; the corresponding relationship between the terminal devices and the soft switches, including the primary soft switch and the secondary soft switch, will be configured in each session border controller, and which primary soft switch a user belongs to may be determined by the network segment of the terminal, and all the terminal devices of one session border controller are proposed to be registered to the same primary soft switch.

In the present embodiment, the first soft switch is configured to be a primary soft switch, and the second soft switch is configured to be a secondary soft switch; the first session border controller is a primary session border controller, and the second session border controller is a secondary session border controller; the terminal device performs registration and authentication at the first soft switch via the first session border controller; when it's detected by the terminal device that a failure (device failure or line failure, etc.) concerning the first session border controller occurs and results in a communication interruption, the terminal device will perform registration and authentication at the first soft switch via the second session border controller; when it's detected by the first or the second session border controller that a failure (device failure or line failure, etc.) concerning the first soft switch occurs and results in a communication interruption, the terminal device will perform registration and authentication at the second soft switch via the first or the second session border controller.

Whether the failure concerning the first session border controller occurs may be detected by the terminal device by means of first handshake information. And whether the failure concerning the first soft switch occurs may be detected by the first session border controller by means of second handshake information. Whether the failure concerning the first soft switch occurs may be detected by the second soft switch by means of the heartbeat information. According to the network segment, the terminal device will determine which primary soft switch it belongs to. All of the terminal devices of one session border controller register to the same primary soft switch.

Figure 3:
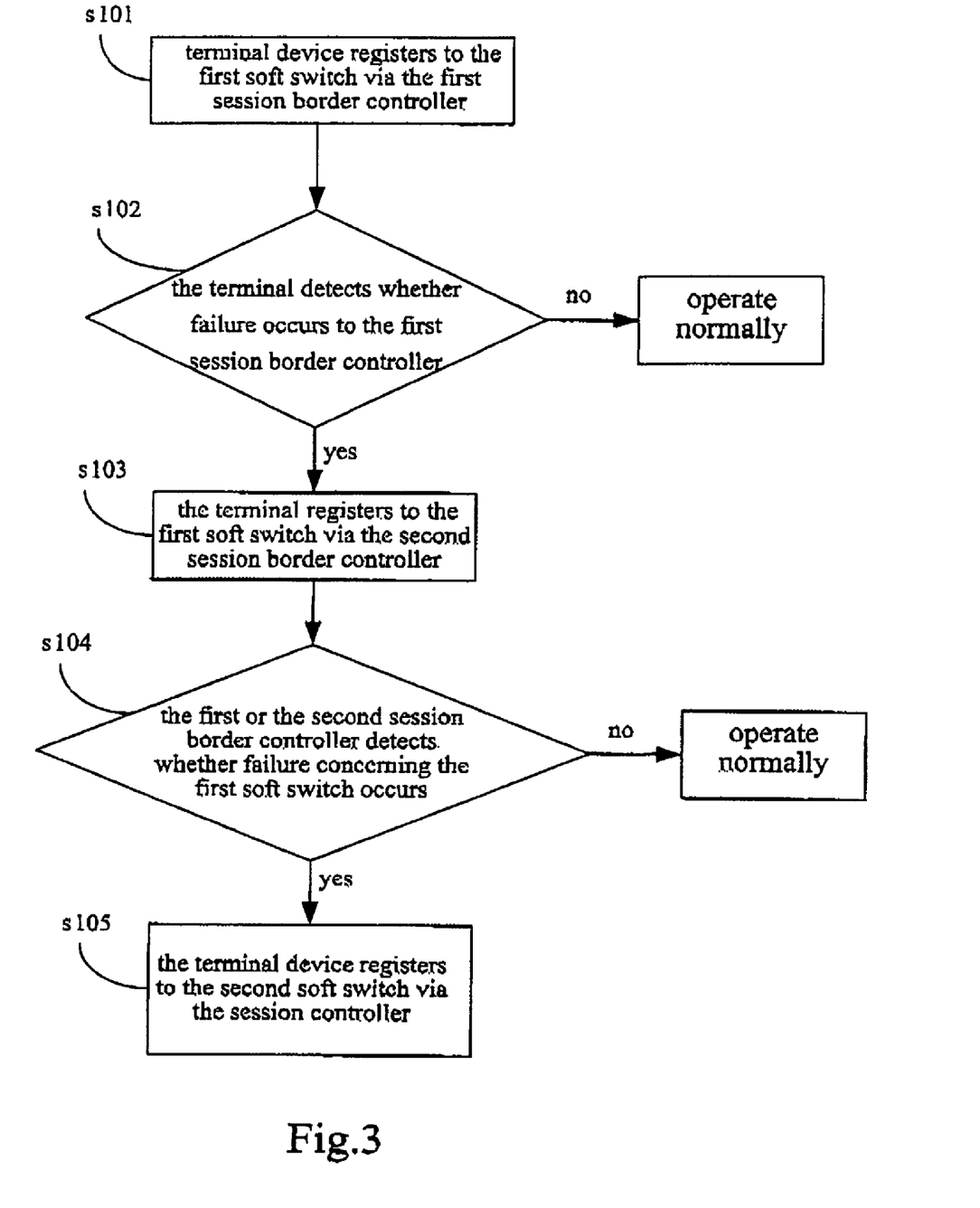
FIG. 3 is a flow chart illustrating the implementation method of dual homing of the session border controllers in the first embodiment of the present invention.

The flow of the implementation method of dual homing of the session border controllers in the first embodiment of the invention is shown as FIG. 3, including:

step S101, a terminal device registers to a first soft switch via a first session border controller. After the registration, the first soft switch will further authenticate the user device.

step S102, whether a failure concerning the first session border controller occurs is detected by the terminal device, if the failure occurs, moves to step S103, otherwise, operates normally. Wherein, the terminal device detects whether the failure concerning the first session border controller occurs by means of the first handshake information, i.e., the terminal device sends a first handshake message to the first session border controller with a first period, and the first session border controller will send a first handshake response message to the terminal device when it works normally, and when the failure concerning the first session border controller occurs, it will stop sending the first handshake response message. The terminal device sends the handshake signal to the first session border controller, and if the response signal from the first session border controller is not received within a predetermined period, then the first session border controller is determined to be subject to the failure.

step S103, the terminal device registers to the first soft switch via the second session border controller, after registration, the first soft switch will further authenticate the user device.

step S104, the first or the second session border controller detects whether a failure concerning the first soft switch occurs, if the failure occurs, moves to step S105, otherwise, operates normally. Wherein, the first or the second session border controller will detect whether the failure concerning the first soft switch occurs by means of the second handshake information, i.e., the first or the second session border controller sends a second handshake message to the first soft switch with a second period, and the first soft switch will send a second handshake response message to the first or the second session border controller when it works normally, or when the failure concerning the first soft switch occurs, it will stop sending the second handshake response message to the first or the second session border controller. The first session or the second border controller sends the handshake signal to the first soft switch, and if the response signal from the first soft switch is not received within a predetermined period, then the first soft switch is determined to be subject to the failure.

The second soft switch detects whether the failure concerning the first soft switch occurs: the second soft switch sends a heartbeat signal to the first soft switch, if the second soft switch has not received a heartbeat response signal from the first soft switch within a predetermined period, then the first soft switch is determined to be subject to the failure. If the failure occurs, the registration of user device will be accepted, otherwise, the registration of user device that belongs to the first soft switch will be rejected. The second soft switch detects whether the failure concerning the first soft switch occurs by means of the heartbeat signal, i.e., the second soft switch sends a heartbeat message to the first soft switch with a third period; the first soft switch will send a heartbeat response message to the second soft switch when it works normally; or the first soft switch will stop sending the handshake response message to the second soft switch when the failure occurs to it.

step S105, the terminal device registers to the second soft switch via the first or the second session border controller. When the first soft switch is recovered, it will send the second handshake response message to the first or the second session border controller, and send the heartbeat response message to the second soft switch; then the first soft switch will retrieve the registration management on the terminal device, and after the registration of the terminal device, the first soft switch will further authenticate the user device.

Embodiment 2

Figure 4:
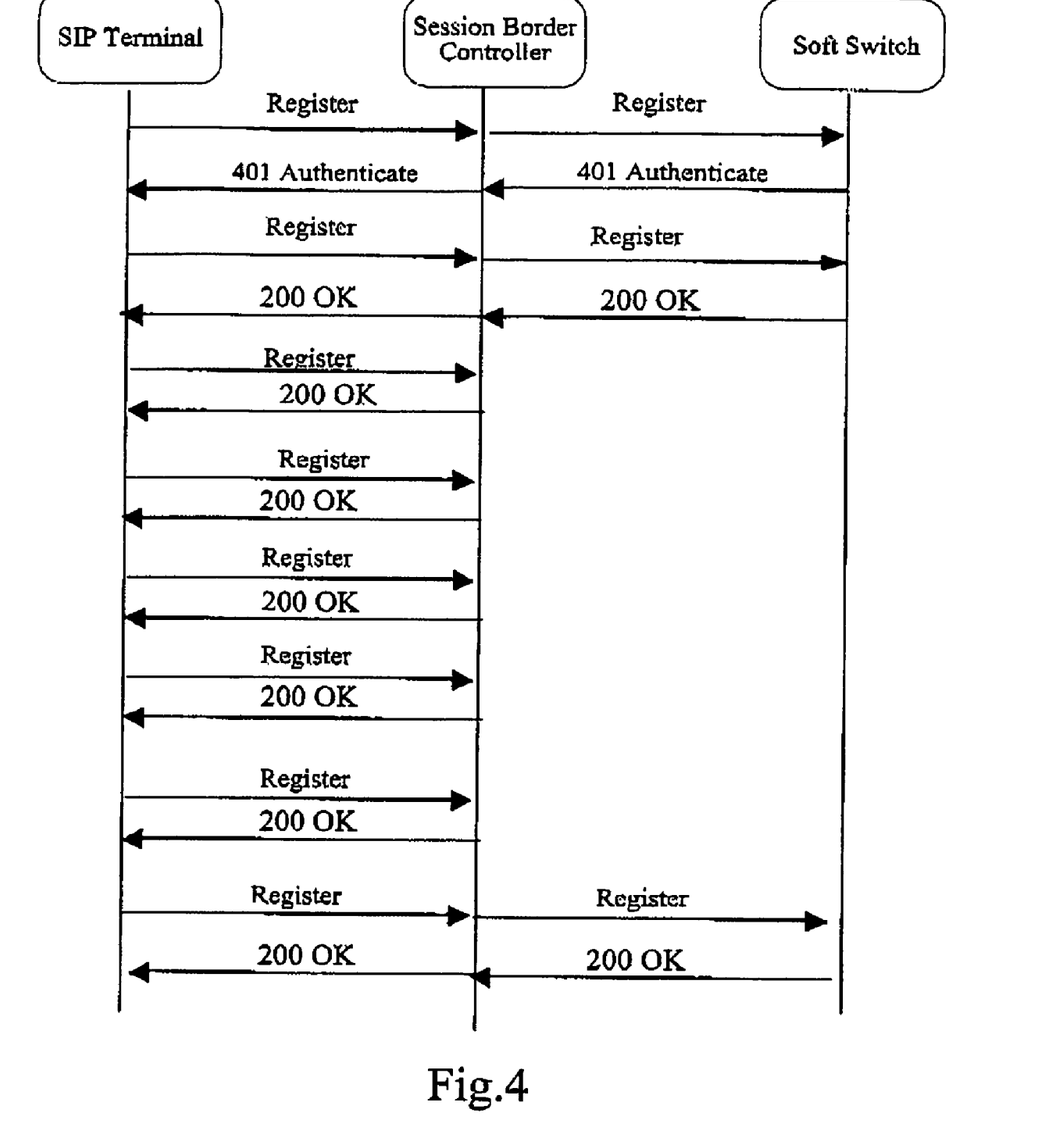
FIG. 4 is a schematic diagram illustrating the implementation process of dual homing of the session border controllers in the second embodiment of the present invention.

A detailed description of the invention will be given by means of the SIP terminal as an example:

Firstly, the first time registration: as shown in FIG. 4, all the SIP terminals will initiate registrations to the session border controller A. For the first registration message initiated by each SIP terminal, the session border controller A forwards it to a primary soft switch of the SIP terminal, and when the registration message has been received by the soft switch, the soft switch will send the 401 authentication message and ask for authentication of the terminal, and when the registration message with the authentication information has been received by the soft switch again, the authentication will be passed. For the subsequent registration process: the SIP terminal initiates a registration to the session border controller A every 5 minutes, while the session border controller A forwards the registration message to the soft switch A every 30 minutes, and the soft switch A replies with 200 OK directly, and for other registration messages, the session border controller A will reply with 200 OK directly.

Wherein, the SIP terminal sends an OPTIONS message to the session border controller A periodically, and the session border controller A replies with 200 OK directly for the OPTIONS message. There is an IP address or a field name of the terminal in the FROM header of the OPTIONS message, and the IP address or field name of the SBC is in the TO header.

The session border controller A sends an OPTIONS message to each soft switch periodically, and the soft switch replies with 200 OK. No user information exists in the OPTIONS message, while only the IP address of the session border controller and the soft switch can exist in the FROM and TO header. The session border controller will send the OPTIONS message several times according to the SIP protocol when it hasn't received the response message from the soft switch, and if the response message still can not be received after that, the soft switch will be considered to be subject to the failure.

If a failure concerning the session border controller A occurs, the OPTIONS message from the SIP terminal will not be replied, and if the SIP terminal can not receive 200 OK, it will send a registration message and an OPTIONS message to the session border controller B, instead. Now there is a new CALLID in the registration message. The configuration of the session border controller B and that of session border controller A are essentially the same, except for the SIP address. The session border controller B will also forward the first registration message from each SIP terminal to the corresponding soft switch. After receiving the registration message, the soft switch determines that the CALLID is different, the authentication process will be restarted, and this process is the same as the process described by the first 4 messages in FIG. 4.

When there is only one soft switch or the existing soft switches do not have the mutual aid function, the system for implementing the dual homing of the session border controllers in the present invention includes a first soft switch, a first session border controller, a second session border controller and at least one terminal device. The first session border controller is a primary session border controller and the second session border controller is a secondary session border controller; the terminal device registers to the first soft switch via the first session border controller; when the terminal device detects that the failure concerning the first session border controller occurs, the terminal device will register to the first soft switch via the second session border controller.

Figure 5:
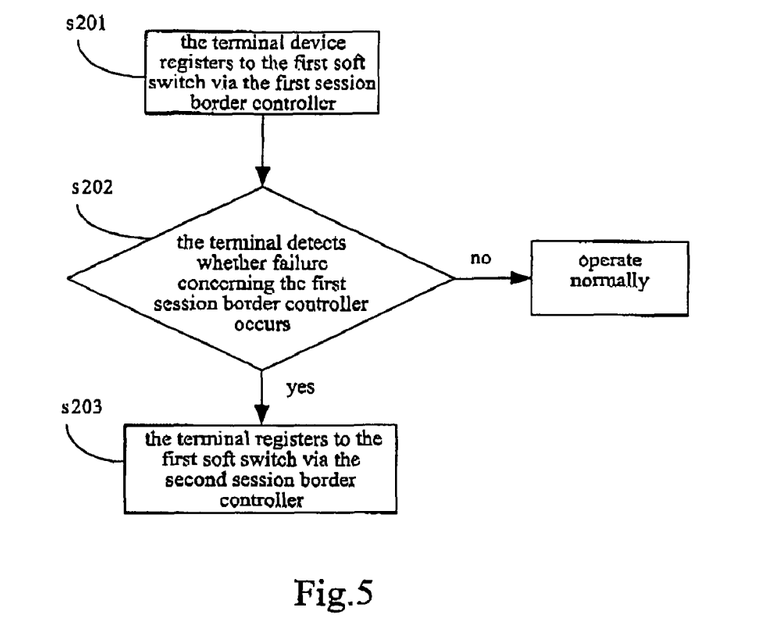
FIG. 5 is a flow chart illustrating the implementation method of dual homing of the session border controllers in the second embodiment of the present invention.

According to the above system, another embodiment of the method for implementing the dual homing of the session border controller in the invention is shown as FIG. 5, including following steps:

step S201: a terminal device registers to a first soft switch via a first session border controller;

step S202: the terminal device detects whether a failure concerning the first session border controller occurs, if the failure occurs, moves to step S203, otherwise, operates normally;

step S203, the terminal device registers to the first soft switch via a second session border controller.

Embodiment 3

Figure 6:
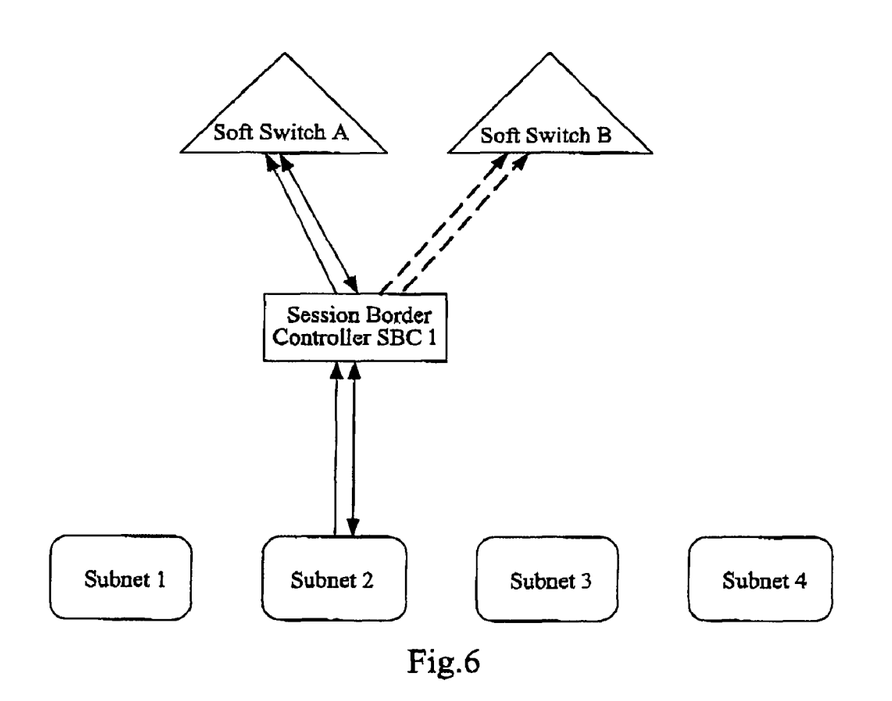
FIG. 6 is a schematic diagram illustrating the principle of dual homing of the soft switches supported by the session border controller in the third embodiment of the present invention

Referring to FIG. 6, in the embodiment, two mutual aid soft switches are set in the system.

The steps for implementing the dual homing of the soft switch supported by the session border controller are shown as follows:

The session border controller detects whether a failure concerning the first soft switch occurs by means of the handshake information, when the session border controller has not received the response from the primary soft switch within a predetermined period, the related messages that need to be sent to the primary soft switch will be forwarded to the secondary soft switch.

When the session border controller has received the response from the primary soft switch, the soft switch for registration will be changed and the related messages will be sent to the primary soft switch.

If the failure concerning the soft switch A occurs, the soft switch A will not response to the OPTIONS message from the session border controller and the heartbeat message between the soft switches. Since the session border controller can not receive the response to the OPTIONS message from the soft switch A, the user's registration message will be forwarded to the substituting soft switch B. When the soft switch B finds out that the heartbeat signal with the soft switch A is interrupted, it will consider that the failure concerning the soft switch A occurs, and the soft switch B will start to take over the terminal devices and gateway devices of the soft switch A. as shown in FIG. 4, the soft switch B starts the registration and authentication process when it receives the registration message from the terminal devices of the soft switch A. If the failure concerning the soft switch A occurs, but the session border controller does not find it out in time by the OPTIONS message, then the registration or calling message sent by the terminal will still be forwarded to the primary soft switch A by the session border controller.

When the primary soft switch has recovered, it responds to the message from the session border controller, and restores the heartbeat messages between the primary and the secondary soft switch.

When the soft switch A has recovered from the failure, it begins to respond to the OPTIONS message from the session border controller, and restores the heartbeat messages between the dual homing soft switches, then the soft switch for registration will be changed again by the session border controller, and the soft switch A will start the registration and authentication process after it receives the registration message from the terminal.

The above is only the preferred embodiments of the invention, it should be noted that various modifications and variations can be made without departing from the principle of the invention by those skilled in the art, and the modifications and variations should come within the scope of the appended claims and their equivalents.

What is claimed is:

1. A method for implementing backup based on session border controllers, comprising:

registering, by a terminal device, to a first soft switch via a first session border controller;

registering, by the terminal device, to the first soft switch via a second session border controller, when a failure concerning the first session border controller occurs;

registering, by the terminal device, to a second soft switch via one of the first session border controller and the second session border controller, when a failure concerning the first soft switch occurs; and wherein registering to the first soft switch via the second session border controller comprises:

sending, by the terminal device, a registration message and an OPTIONS message to the second session border controller, wherein a new CALLID is carried in the registration message;

forwarding, by the second session border controller, the registration message from the terminal device to the first soft switch;

receiving, by the first soft switch, the registration message; and performing, by the first soft switch, an authentication process for the terminal device according to the new CALLID carried in the registration message.

2. The method according to claim 1, wherein the method further comprises a step of determining whether the failure concerning the first session border controller occurs, and the step of determining comprises:

sending, by the terminal device, a handshake signal to the first session border controller, and determining an occurrence of failure if no response signal is received from the first session border controller within a predetermined period.

3. The method according to claim 1, wherein the method further comprises a step of determining whether a failure concerning the first soft switch occurs, the step of determining comprising: sending, by one of the first session border controller and the second session border controller, a handshake signal to the first soft switch, and determining that the failure occurs if no response signal is received from the first soft switch within a predetermined period.

4. The method according to claim 1, wherein the method further comprises:

detecting, by the second soft switch, whether the failure concerning the first soft switch occurs;

if the failure concerning the first soft switch occurs, taking over, by the second soft switch, registering of user devices in the first soft switch; and otherwise, rejecting the registration of user devices in the first soft switch.

5. The method according to claim 1, wherein the method further comprises:

sending, by the first soft switch, a handshake response message to one of the first session border controller and the second session border controller and a heartbeat response message to the second soft switch, when the first soft switch recovers from the failure;

the first soft switch proceeding with registering.

6. The method according to claim 1, wherein the method further comprises:

registering, by terminal devices belonging to the first session border controller and the second session border controller, to one of the first soft switch and the second soft switch.

7. The method according to claim 2, wherein the method further comprises:

registering, by terminal devices belonging to the first session border controller and the second session border controller, to one of the first soft switch and the second soft switch.

8. The method according to claim 3, wherein the method further comprises:

registering, by terminal devices belonging to the first session border controller and the second session border controller, to one of the first soft switch and the second soft switch.

9. The method according to claim 4, wherein the method further comprises:

registering, by terminal devices belonging to the first session border controller and the second session border controller, to one of the first soft switch and the second soft switch.

10. The method according to claim 5, wherein the method further comprises:

registering, by terminal devices belonging to the first session border controller and the second session border controller, to one of the first soft switch and the second soft switch.

11. A system for implementing backup based on session border controllers, comprising a first soft switch, a second soft switch, a first session border controller and a second session border controller, wherein:

the first soft switch is configured as a primary soft switch, the second soft switch is configured as a secondary soft switch;

the first session border controller is configured as a primary session border controller, the second session border controller is configured as a secondary session border controller;

the second session border controller is configured to receive a registration message and an OPTIONS message from the terminal device when a failure concerning the first session border controller occurs, wherein a new CALLID is carried in the registration message;

the second session border controller is further configured to forward the registration message from the terminal device to the first soft switch;

the first soft switch is configured to receive the registration message; and the first soft switch is configured to perform an authentication process for the terminal device according to the new CALLID carried in the registration message.

12. The system according to claim 11, wherein the at least one terminal device is configured to detect whether the failure concerning a session border controller occurs by means of first handshake information.

13. The system according to claim 11, wherein one of the first session border controller and the second session border controller is configured to detect whether a failure concerning the first soft switch occurs according to the handshake information.

14. The system according to claim 11, wherein the session border controller is configured to determine, according to network segments, the primary soft switch that the at least one terminal device should register to.

15. The system according to claim 14, wherein all the terminal devices belonging to one session border controller is configured to register to the same primary soft switch.

* * * * *